(12) United States Patent
Morimoto et al.

(10) Patent No.: US 7,540,569 B2
(45) Date of Patent: *Jun. 2, 2009

(54) WHEEL-USE BEARING APPARATUS

(75) Inventors: Shunji Morimoto, Kashiba (JP);
Nobuyoshi Murakami, Kashiwara (JP);
Koichi Nate, Chuo-ku (JP)

(73) Assignee: Koyo Seiko Co., Ltd., Osaka (JP)

( * ) Notice: Subject to any disclaimer, the term of this patent is extended or adjusted under 35 U.S.C. 154(b) by 230 days.

This patent is subject to a terminal disclaimer.

(21) Appl. No.: 11/117,743

(22) Filed: Apr. 25, 2005

(65) Prior Publication Data

US 2005/0184582 A1    Aug. 25, 2005

Related U.S. Application Data

(62) Division of application No. 10/193,929, filed on Jul. 12, 2002, now Pat. No. 6,921,137.

(30) Foreign Application Priority Data

Jul. 18, 2001    (JP) .................... P2001-218178

(51) Int. Cl.
*B60B 27/00*    (2006.01)
*B60T 1/06*    (2006.01)
(52) U.S. Cl. .................. 301/105.1; 188/18 A
(58) Field of Classification Search .............. 301/6.1, 301/6.8, 105.1, 35.621; 384/544; 188/18 A, 188/218 XL
See application file for complete search history.

(56) References Cited

U.S. PATENT DOCUMENTS

| | | | |
|---|---|---|---|
| 5,031,967 A * | 7/1991 | Svensson | 301/105.1 |
| 6,170,919 B1 * | 1/2001 | Hofmann et al. | 301/105.1 |
| 6,174,117 B1 * | 1/2001 | Kawatani et al. | 411/107 |
| 6,190,102 B1 * | 2/2001 | Vignotto et al. | 301/105.1 |
| 6,309,110 B1 | 10/2001 | Tajima et al. | |
| 6,357,925 B2 | 3/2002 | Tajima et al. | |
| 6,408,669 B1 | 6/2002 | Meeker et al. | |
| 6,422,369 B1 * | 7/2002 | McCalla | 301/105.1 |
| 6,464,399 B1 * | 10/2002 | Novak et al. | 301/105.1 |
| 6,485,109 B2 | 11/2002 | Brinker et al. | |
| 6,553,666 B2 * | 4/2003 | Miyazaki | 301/105.1 |
| 6,666,303 B2 * | 12/2003 | Torii et al. | 188/18 A |
| 6,921,137 B2 * | 7/2005 | Morimoto et al. | 301/6.8 |
| 7,044,563 B2 * | 5/2006 | Suzuki | 301/105.1 |

FOREIGN PATENT DOCUMENTS

JP    8-270693    10/1996

* cited by examiner

*Primary Examiner*—Jason R Bellinger
(74) *Attorney, Agent, or Firm*—Jordan and Hamburg LLP

(57) ABSTRACT

A flange face portion located radially outwardly of boltholes of a flange is formed as a tilting face so that a maximum oppositely-spaced distance α of the flange face portion from a disc rotor is preferably 10 μm. Thereby, minimization is implemented for convex deformation of an outer circumferential end portion of the flange when bolts are press-inserted into boltholes, when nuts are tightened onto bolts, tightening forces compress the disc rotor and the flange to be in close contact and to be fixed-via planar surfaces thereof without clearance being formed therebetween. Consequently, the accuracy of side run-out with surface of the flange can be prevented from being deteriorated.

19 Claims, 14 Drawing Sheets

F I G. 1A
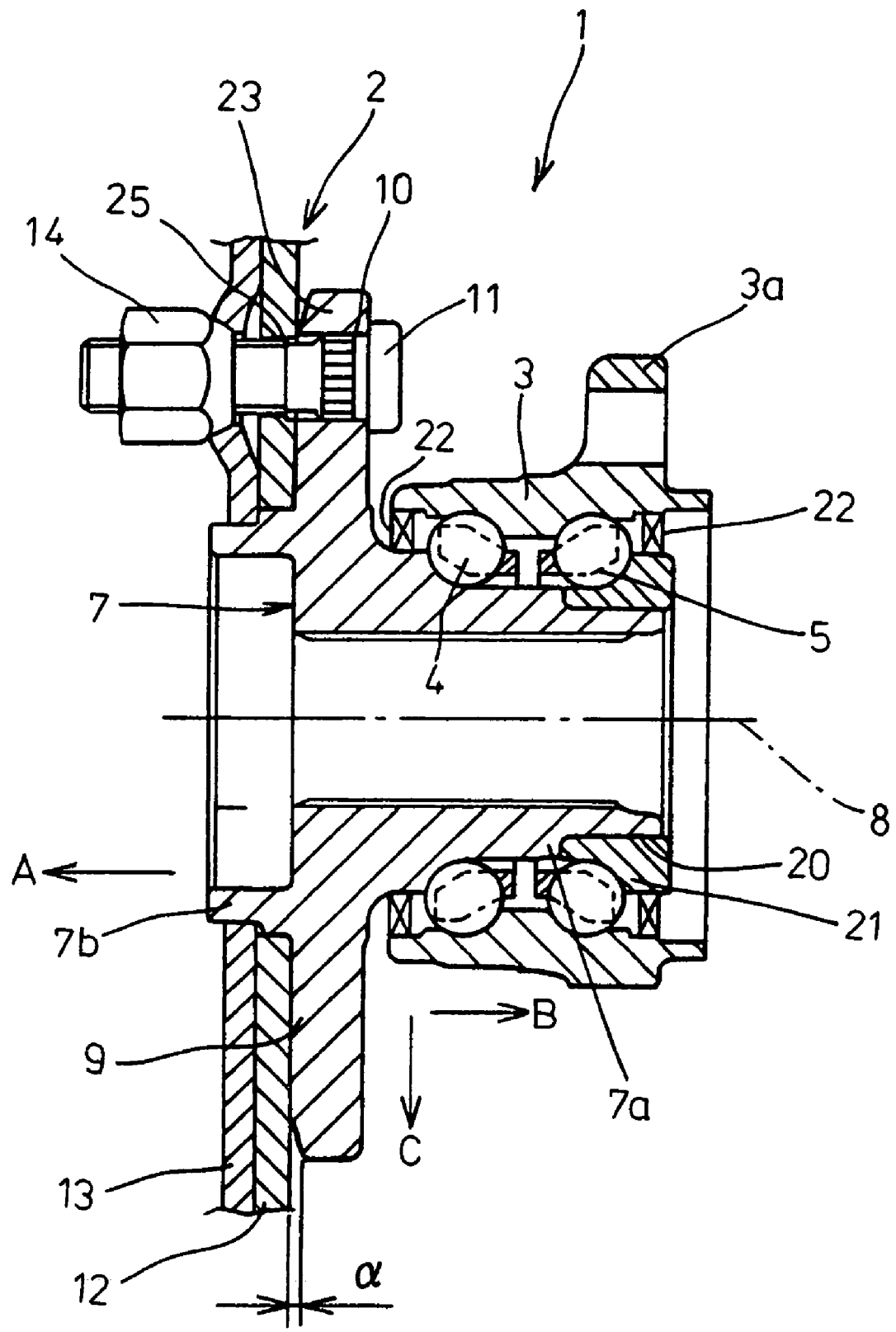

PRIOR ART

WHEEL-USE BEARING APPARATUS

REFERENCE TO RELATED APPLICATION

This is a divisional application of U.S. patent application Ser. No. 10/193,929, filed Jul. 12, 2002, issued on Jul. 26, 2005, as U.S. Pat. No. 6,921,137.

FIELD OF THE INVENTION

The present invention relates to a wheel-use bearing apparatus suitable for supporting a wheel of vehicles and the like.

BACKGROUND OF THE INVENTION

Hereinbelow, such wheel-use bearing apparatus will be described with reference to FIG. 11. A wheel-use bearing apparatus 1 includes an outer ring member 3 mounted on the side of a vehicle body, and a hub wheel 7 mounted inward of the outer ring member 3 via double rows of balls 4 and 5. The hub wheel 7 is rotatably supported by the balls 4 and 5 on a rotational rotational center axis 8. An annular flange 9 projecting in a radially outer direction C of the hub wheel 7 is formed on an outer peripheral surface of a vehicle outer side A of the hub wheel 7. A plurality of boltholes 10 is formed on a flange surface of the flange 9 at the same pitch in a circumferential direction of the flange 9. Bolts 11 are respectively press-inserted into the boltholes 10.

Hereinbelow, a wheel mounting structure 2 of the apparatus 1 will be described. A brake disc rotor 12 and a wheel member 13 are provided to overlap with each other through the bolts 11 as opposed to flange face of a vehicle outer side A of flange 9. Nuts 14 are threadably tightened onto the bolts 11. Thus, the structure 2 is configured. The disc rotor 12 and the wheel member 13 are fixed with the nuts 14 to the flange 9.

In the wheel mounting structure 2, since the nuts 14 are tightened in a later step, the hub bolts 11 are press-inserted into the boltholes 10 of the flange 9. When the bolts 11 are press-fitted to the flange 9, pressing forces cause deformation of peripheral area of press-fitted portions of the bolts 11 of the flange 9. Particularly, an outer circumferential end portion of the flange 9 is deformed convex toward the vehicle outer side A. Depending on the amount of the deformation, adverse effects can be caused on the accuracy of side run-out with surface of the flange 9.

SUMMARY OF THE INVENTION

Accordingly, a primary object of the present invention is to provide a wheel-use bearing apparatus in which bolts can be fixed into boltholes of a flange not to cause adverse effects on the accuracy of side run-out with the surface of the flange.

Further objects, features, and advantages of the present invention will become apparent from descriptions given hereunder.

In summary, the present invention includes an outer ring member, an inner ring member disposed concentric with the outer ring member, and a plurality of rolling elements provided between the outer ring member and the inner ring member. A radially-outwardly directional flange is formed on one of the outer ring member and the inner ring member. The flange includes a flange face in which boltholes are through-formed and onto which a wheel-mounting member is mounted by press-inserting bolts through the boltholes. A flange face portion located radially outwardly of the boltholes in the flange face is formed as a tilting face that tilts such as to be gradually spaced away from the wheel-mounting member as being closer to an outer circumferential end face of the flange. The tilting face may be either a curved face or a planar face.

Since the flange face portion is formed as the aforementioned tilting face, deformation occurring in the flange when the bolts are press-inserted into the boltholes can be minimized. When nuts are tightened onto bolts, the flange and wheel-mounting member are fixed via planar surfaces thereof without clearance. Consequently, the accuracy of side run-out with surface of the flange can be prevented from being deteriorated.

The maximum oppositely-spaced distance is preferably set to 20 μm or shorter. When the distance is set to the value, deformation occurring when the bolts are press-inserted into the boltholes can be minimized even more effectively.

BRIEF DESCRIPTION OF THE DRAWINGS

These and other objects as well as advantages of the invention will become clear by the following description of the preferred embodiments of the invention with reference to the accompanying drawings, wherein:

FIGS. 1A and 1B are cross-sectional views showing overall configurations of wheel-use bearing apparatuses according to alternative embodiments of the present invention;

In all these figures, like components are indicated with the same numerals.

DETAILED DESCRIPTION OF THE PREFERRED EMBODIMENTS

Figure 1B:
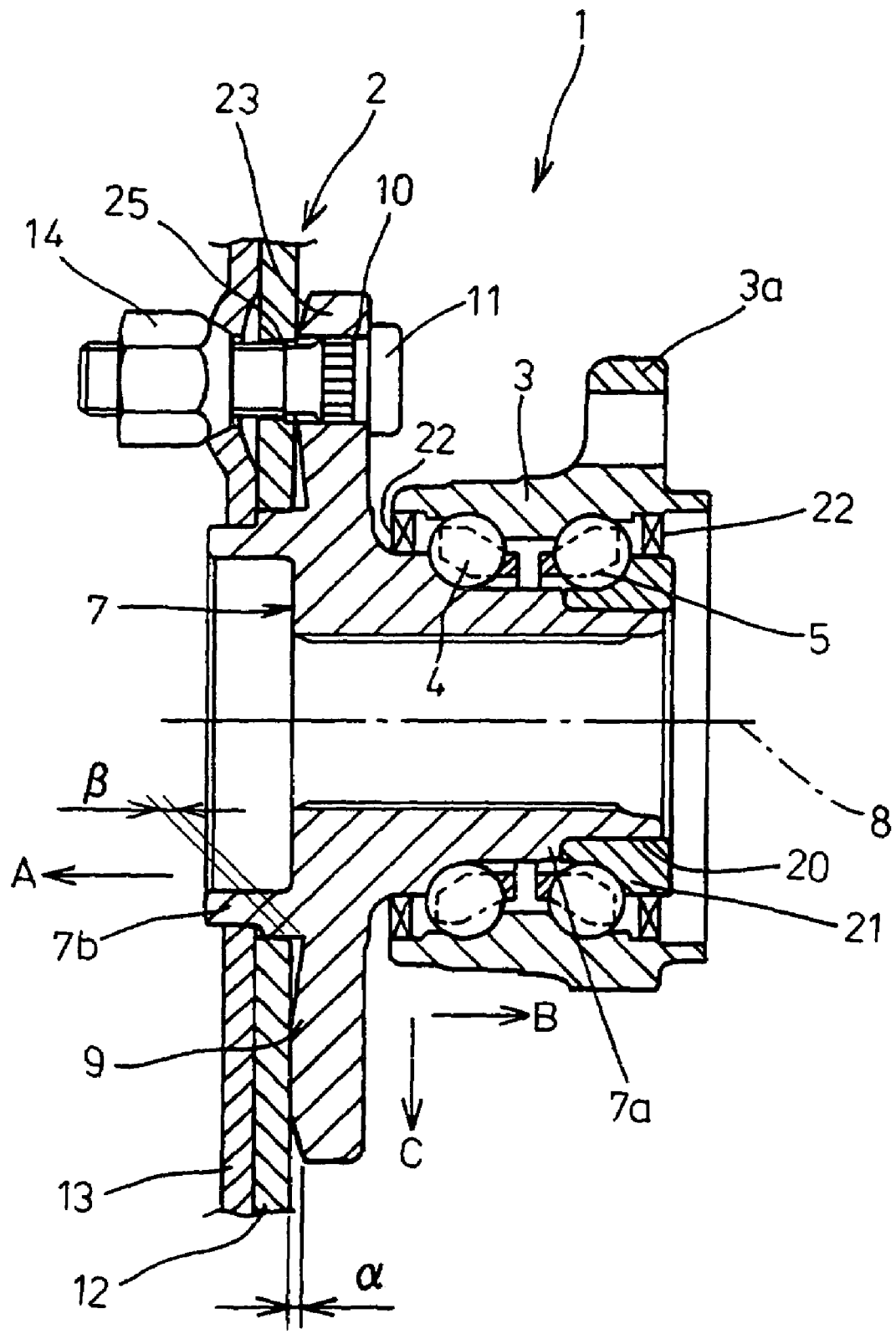
Figure 2:
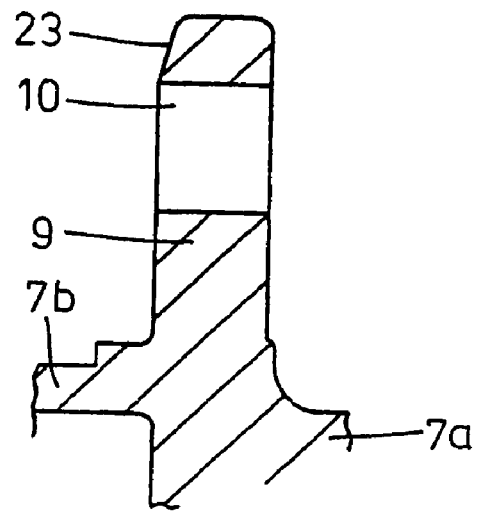
FIG. 2 is an enlarged cross-sectional view of an essential portion of the configuration shown in FIG. 1.
Figure 3:
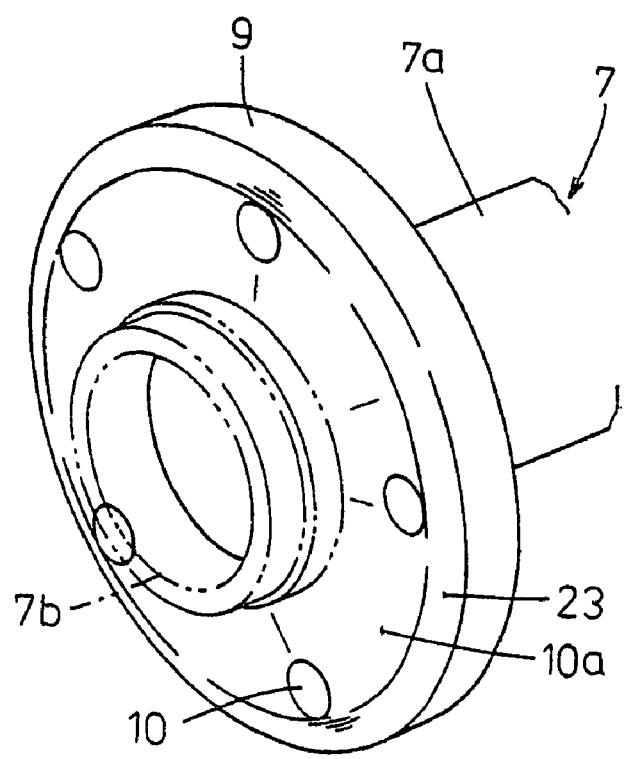
FIG. 3 is an enlarged perspective view of an essential portion of the configuration shown in FIG. 1.

Hereinbelow, referring to FIGS. 1A to 3, a description will be provided regarding the configuration of a wheel-use bearing apparatus to which a preferred embodiment of the invention is applied. The wheel-use bearing apparatus 1 is used with a driving wheel. The apparatus 1 includes an outer ring member 3 non-rotatably mounted on the side of the vehicle body. The outer ring member 3 is mounted to a flange 3a formed to extend in a radially outer direction C on an outer peripheral surface via a knuckle (not shown). A hub wheel 7 is supported rotatable on a rotational center axis 8 via balls 4 and 5 provided as rolling elements in double raceways along the axis direction (in the outer ring member 3). The hub wheel 7 is an inner ring member for the outer ring member 3. An annular groove 20 is formed in a vehicle inner side B of the hub wheel 7. An inner ring member 21, which is a different member from the hub wheel 7, is engageably fitted to the annular groove 20. The balls 4 in the one row use an outer peripheral surface of a body portion 7a of the hub wheel 7 as an inner ring raceway surface, and the balls 5 in the other row use an outer peripheral surface of the inner ring member 21 as an inner ring raceway surface. The wheel-use bearing apparatus 1 as a whole has a configuration of an angular ball bearing with double raceways.

Seal members 22 are respectively provided in a vehicle outer side A of the balls 4 and in the vehicle inner side B of the balls 5. The seal members 22 seal lubricant between the two rows of the balls 4 and 5 and prevent the intrusion of muddy water and the like from the outside.

Hereinbelow, the wheel mounting structure 2 will be described. An annular flange 9 radially extending in a radially outer direction C is formed on an outer peripheral surface on a vehicle outer side A of the hub wheel 7. In a flange face of the flange 9, boltholes 10 are axially through-formed in, for example, five portions, at the same pitch in the circumferential direction of the flange 9. Through the boltholes 10, mounting bolts 11, for example, a disc rotor are inserted. An axially extending portion 7b is formed in the vehicle outer side A of the flange 9.

As a circumferentially annular face including the boltholes 10, a flange surface 10a on the vehicle outer side A of the flange 9 is formed radially planar. A flange face portion 23 of the flange surface 10a is formed radially outwardly of the boltholes 10 so as to gradually tilt toward the vehicle inner side B as being closer to the outer circumferential end face of the flange 9. Specifically, the flange face portion 23 is formed as a tilting planar face that tilts along the circumferential direction so as to be spaced away from the disc rotor 12, which is provided as a wheel-mounting member. The tilting planar face is formed such that a maximum oppositely-spaced distance α from the disc rotor 12 on the outer circumferential end face of the flange 9 is 10 μm.

The disc rotor 12 receives a brake force exerted by brake calipers (not shown). A tire wheel member 13 (another wheel-mounting member) is overlapped with a portion of the disc rotor 12 on the vehicle outer side A, insertion holes 25 through which the hub bolts 11 are inserted are formed in the disc rotor 12 and the tire wheel member 13, and the disc rotor 12 and then the tire wheel member 13 are placed to overlap with the flange 9. In this state, the nuts 14 are tightened onto the individual bolts 11, and the disc rotor 12 and the tire wheel member 13 are fixed to the flange 9.

When the disc rotor 12 and the tire wheel member 13 are mounted to the wheel-use bearing apparatus 1 in the above-described configuration, the disc rotor 12 is brought such as to fit to the axially extending portion 7b of the flange 9 on the vehicle outer side A. Concurrently, the disc rotor 12 is brought such that the insertion holes 25 thereof are fit onto the bolts 11 preliminarily press-inserted into the boltholes 10 of the flange 9. Thereby, the disc rotor 12 is placed to overlap with the flange 9. Similarly, the tire wheel member 13 is placed to overlap with the disc rotor 12 such that the bolts 11 are inserted into the insertion holes 25. In this state, the nuts 14 are respectively tightened onto the bolts 11, and the disc rotor 12 and the tire wheel member 13 are fixed to the hub wheel 7 (flange 9). The bolts 11 are preliminarily press-inserted into the boltholes 10 of the flange 9 along the direction from the vehicle inner side B to the vehicle outer side A. At this time, in the flange face portion on the vehicle outer side A, the outer circumferential end portion of the flange 9, that is, the portion located radially outwardly of the boltholes 10, tends to be deformed convex toward the vehicle outer side A.

In the embodiment of the invention, the flange face portion 23 located radially outwardly of the boltholes 10 of the flange 9 is formed as a tilting planar face having a maximum oppositely-spaced distance .alpha. of 10 μm from the disc rotor 12 in the outer circumferential end face of the flange 9.

Because of the above-described formation, even in a case where convex deformation has occurred in the outer circumferential end portion of the flange 9 when the bolts 11 have been press-inserted into the boltholes 10 of the flange 9, the deformation can be reduced by a certain degree. Consequently, the amount of convex deformation occurring when the bolts 11 are press-inserted into the boltholes 10 is reduced small with respect to the flange face on the vehicle outer side A. For example, suppose a convex deformation of 30 μm can occur when the press-insertion of the bolts 11. In this case, when a tilting face as described above is formed, a convex deformation of at most 20 μm remains.

Thereby, the state where the portion of the boltholes 10 in the flange 9 is made concave in comparison to the convex portion can be maintained, and the amount of the convex deformation can be reduced to be of an optimal value.

When the nuts 14 are respectively tightened onto the bolts 11 in the above-described state, a tightening force thereby exerted works to fix the disc rotor 12 and the flange 9 via the planar faces thereof that are compressed to be in close contact with each other without clearance therebetween. Thereby, the accuracy of side run-out with the surface of the flange 9 can be prevented from being deteriorated.

Table 1 shows results of experiments regarding the amounts of side run-out with the surface in a case where the hub wheel 7 is rotated on rotational center axis 8.

TABLE 1

| Shape | Conventional Example | | Embodiment | |
| --- | --- | --- | --- | --- |
| Measuring Method | Direct Measurement | Plate-Using Measurement | Direct Measurement | Plate-Using Measurement |
| N | 100 | 100 | 100 | 100 |
| Max | 21.8 | 23.0 | 18.4 | 14.2 |
| Min | 3.2 | 1.6 | 3.8 | 1.2 |
| Average | 9.74 | 8.15 | 9.41 | 6.45 |
| Standard Deviation | 3.60 | 4.45 | 2.94 | 2.98 |
| Cmk | 0.37 | 0.39 | 0.47 | 0.72 |

In Table 1, the column items represents as follows:
N = Number of experiments
Max = Maximum value of run-out amount (μm)
Min = Minimum value of run-out amount (μm)
Average = Average value of run-out amounts (μm)
Standard Deviation = Standard deviation in run-out amount
Cmk = Process capability The direct measurement refers to measurement in a case where the outer ring member 3 is fixed, and the hub wheel 7 is rotated on the rotational center axis 8 in a state where the bolts 11 are press-inserted into the boltholes 10 of the hub wheel 7. The plate-using measurement refers to measurement in a case of using plates (not shown) as substitutes for the disc rotor 12 and the tire wheel member 13.

Table 1 verifies that the Cmk can be improved and the run-out amount of the disc rotor 12 is reduced according to the configuration in which, in the flange face portion of the flange 9, the flange face portion 23 located radially outwardly of the boltholes 10 is formed as the tilting planar face that gradually tilts toward the vehicle inner side B as being closer to the outer circumferential end face of the flange 9; and concurrently, the flange face portion 23 is formed such that the maximum oppositely-spaced distance α from the disc rotor 12 on the outer circumferential end face of the flange 9 is 10 μm.

Figure 4:
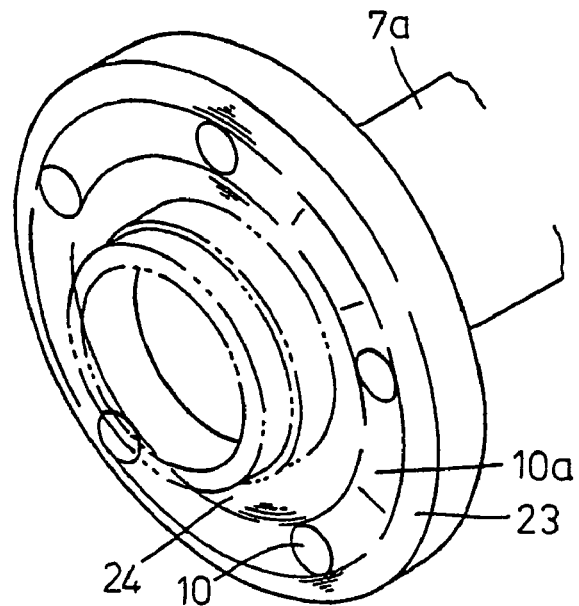
FIG. 4 is an enlarged perspective view of an essential portion of a wheel-use bearing apparatus according to another preferred embodiment of the present invention.

Hereinbelow, another embodiment of the invention will be described with reference to FIG. 4. According to the above-described embodiment, in the flange face portion of the flange 9, the flange face portion 23 located radially outwardly of the boltholes 10 is formed as the tilting planar face that gradually tilts toward the vehicle inner side B as being closer to the outer circumferential end face of the flange 9; and concurrently, the flange face portion 23 is formed such that the maximum oppositely-spaced distance α from the disc rotor 12 on the outer circumferential end face of the flange 9 is 10 μm. However, in the present embodiment, in addition to the above-described arrangement, a flange face portion 24 located radially inwardly of the boltholes 10 is formed as a tilting planar face that gradually tilts toward the vehicle inner side B as being closer to the center of the hub wheel 7; and concurrently, the flange face portion 24 is formed such that a maximum oppositely-spaced distance β from the disc rotor 12 in an end position thereof (base end portion of the flange 9) is 10 μm (as shown by virtual lines in FIGS. 1B, 7B, 8B, 9B and 10B). In this embodiment, an annular face 10a is formed planar to include boltholes 10 provided along the circumferential direction and to have the same width as the diameter of each of the boltholes 10. Other configurations are the same as those of the embodiment described first.

The present embodiment is effective in the configuration in which the radially outer side and the radially inner side of the boltholes 10 are deformed convex when the bolts 11 are press-inserted into the boltholes 10 of the flange 9. Similar to the configuration of the first embodiment, in comparison to the shape of the conventional flange 9, it has been verified that the Cmk can be improved, and the accuracy of side run-out with the surface of the disc rotor 12 can be prevented from being deteriorated.

Figure 5:
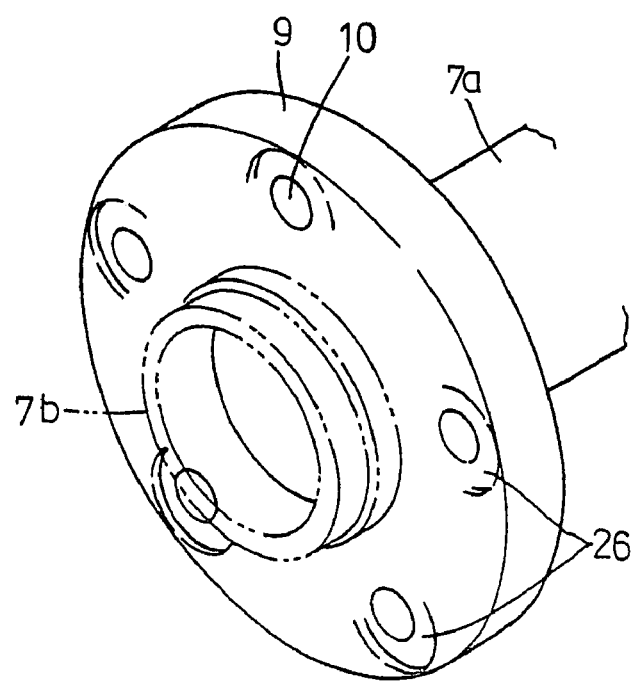
FIG. 5 is an enlarged perspective view of an essential portion of a wheel-use bearing apparatus according to still another preferred embodiment of the present invention.
Figure 6:
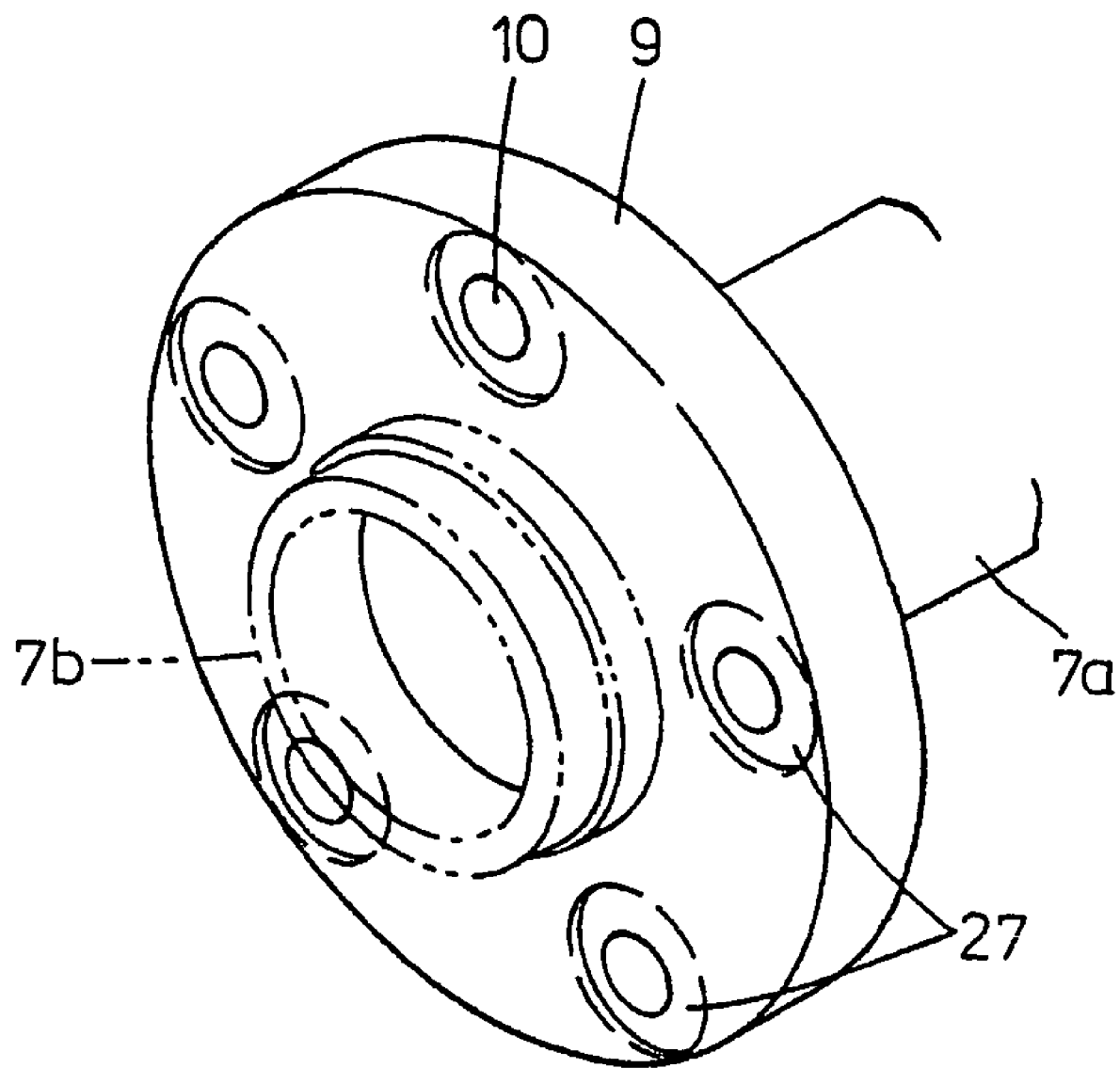
FIG. 6 is an enlarged perspective view of an essential portion of a wheel-use bearing apparatus according to still another preferred embodiment of the present invention.

The invention is not limited to the configuration in which the flange face portion 23 or the flange face portion 24 is formed to have the annular face along the circumferential direction of the flange 9. As shown in FIG. 5, only the radial outer face in an outer circumferential portion of each of the boltholes 10 may be formed in the form of a tilting planar face 26 that tilts toward the vehicle inner side B. Alternatively, depending on the case, as shown in FIG. 6, the overall outer circumferential portion of each of the boltholes 10 may be formed as a tilting planar face 27 that tilts toward the vehicle inner side B and that is circularly concentric with the bolthole 10. In any of the cases, operational advantages similar to those of the above-described embodiments can be achieved. The tilt amount of each of the tilting planar face 26 and the tilting planar face 27 is set similar to that of each of the above-described embodiments. Although the tilting planar face is formed on the flange 9 in each of the above-described embodiments, the present invention is not limited thereby. Instead of the tilting planar face, a tilting curved face may be formed to be spaced away from the disc rotor 12 as in the case of the tilting planar face. Also in this case, the accuracy of side run-out with the surface of the disc rotor 12 can be prevented from being deteriorated, as in the case of each of the above-described embodiments.

In the above-described embodiments, the tilting planar face or the tilting curved face is formed such that the maximum oppositely-spaced distanced from the disc rotor 12 is 10 μm. However, even with a maximum oppositely-spaced distanced set in a range of from 20 to 10 μm, the accuracy of side run-out with the surface of the disc rotor 12 can be prevented from being deteriorated, as in the case of each of the above-described embodiments.

Figure 7A:
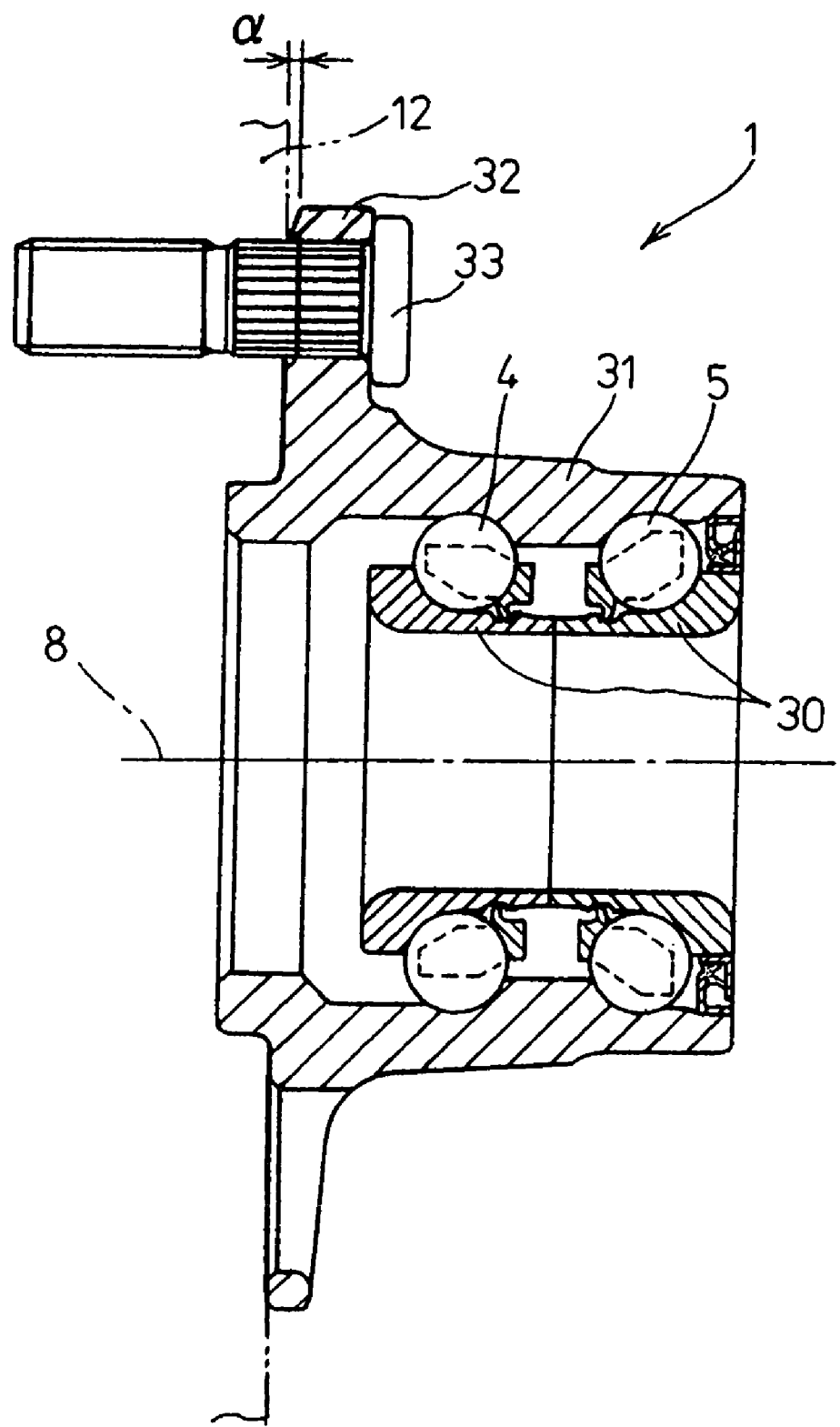
FIGS. 7A and 7B are cross-sectional views showing the overall configurations of wheel-use bearing apparatuses according to still further alternative embodiments of the present invention.
Figure 7B:
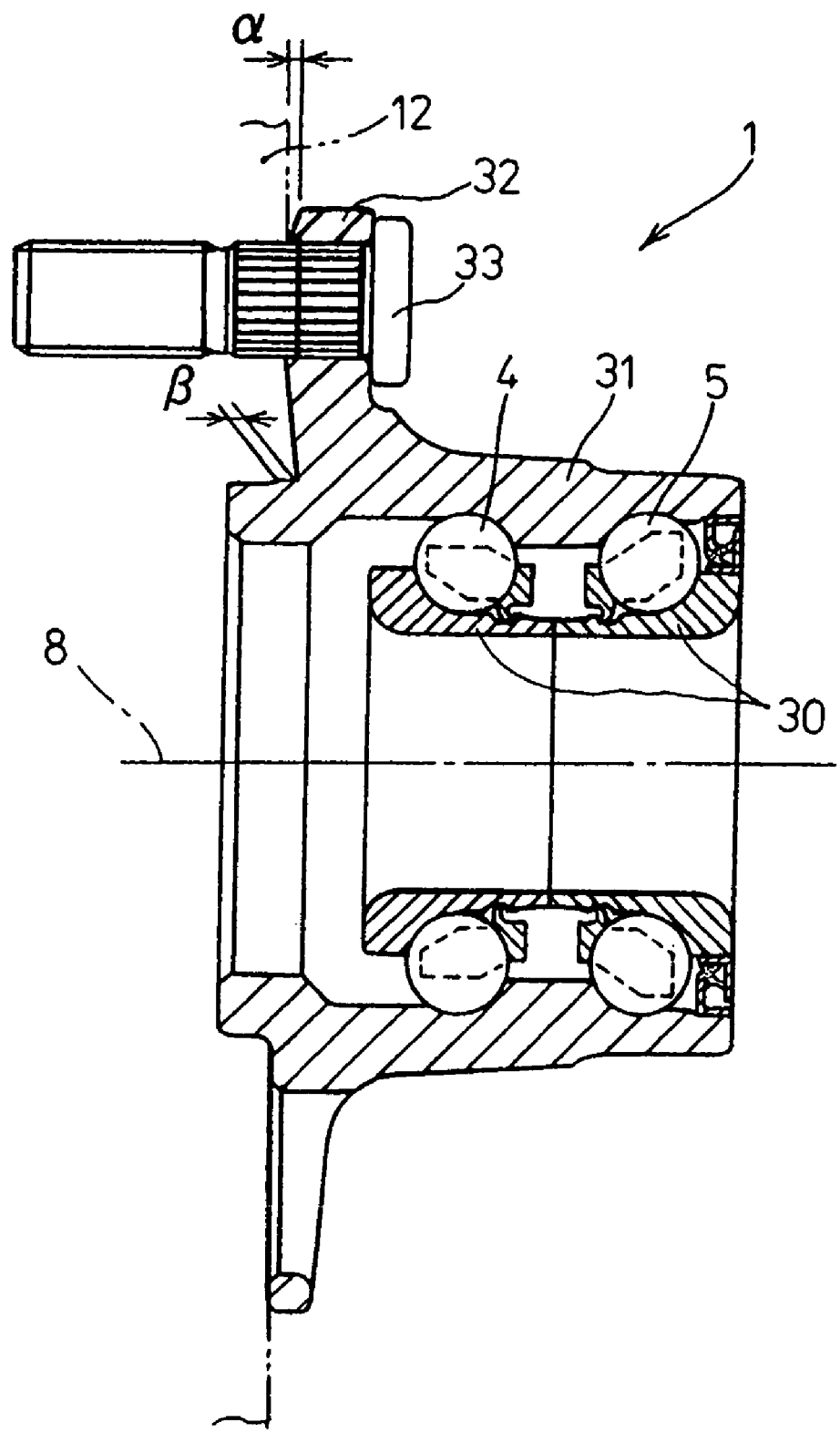

In the above-described embodiments, description has been made with reference to the configuration in which the hub wheel 7 (inner ring member) is supported by the outer ring member 3, which is fixed to the vehicle body, to be rotatable on the rotational center axis 8 via the double rows of the balls 4 and 5 provided as rolling elements. However, the invention is not limited to this configuration and may of course be applied to a wheel-use bearing apparatus 1 (used with a driving wheel) shown in FIGS. 7A and 7B. Specifically, axial two rows of inner ring members 30 are non-rotatably supported in the side of the vehicle-body side, and an outer ring member 31 is formed rotatable on the rotational center axis 8 via double rows of balls 4 and 5. A flange 32 radially outwardly extending is formed on the outer ring member 31, bolts 33 are press-inserted into the flange 32. Also in this case, the maximum oppositely-spaced distance α from a disc rotor 12 in the outer circumferential end face of the flange 32 or the maximum oppositely-spaced distance β in the base end portion of the flange 32 is set similar to that in the respective embodiment described above. Thereby, even when the bolts 33 are press-inserted into the flange 32, the accuracy of side run-out with the surface of the disc rotor 12 can be prevented from being deteriorated.

The present invention may also be applied to other types of wheel-use bearing apparatuses 1 as those to respectively be provided as hub units shown in FIGS. 8 to 10, each including a hub wheel 7 formed rotatable on a rotational center axis 8 via rolling elements in an outer ring member 3 mounted on the vehicle-body side.

Figure 8A:
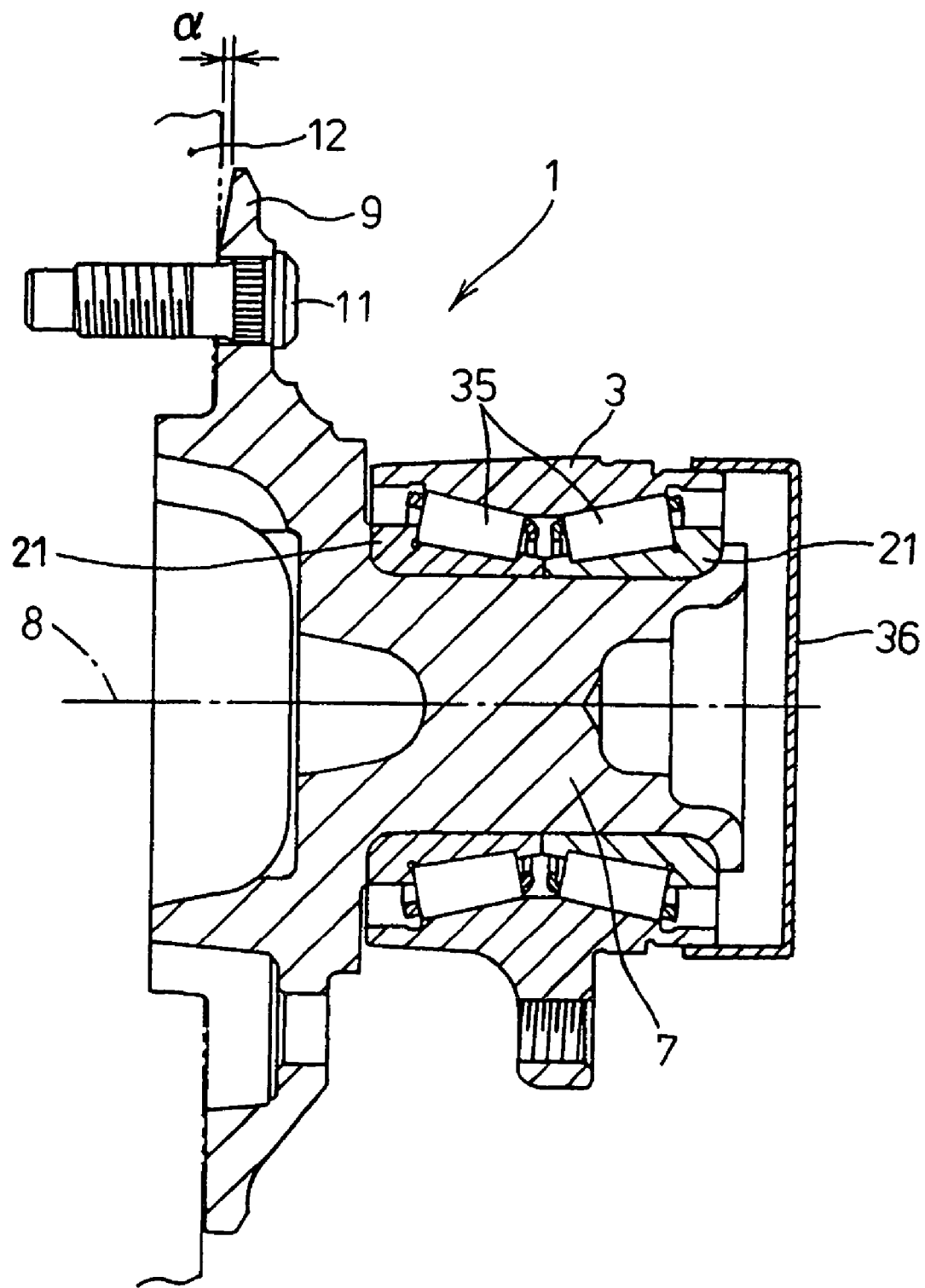
FIGS. 8A and 8B are cross-sectional views showing the overall configurations of wheel-use bearing apparatuses according to still further alternative embodiments of the present invention.
Figure 8B:
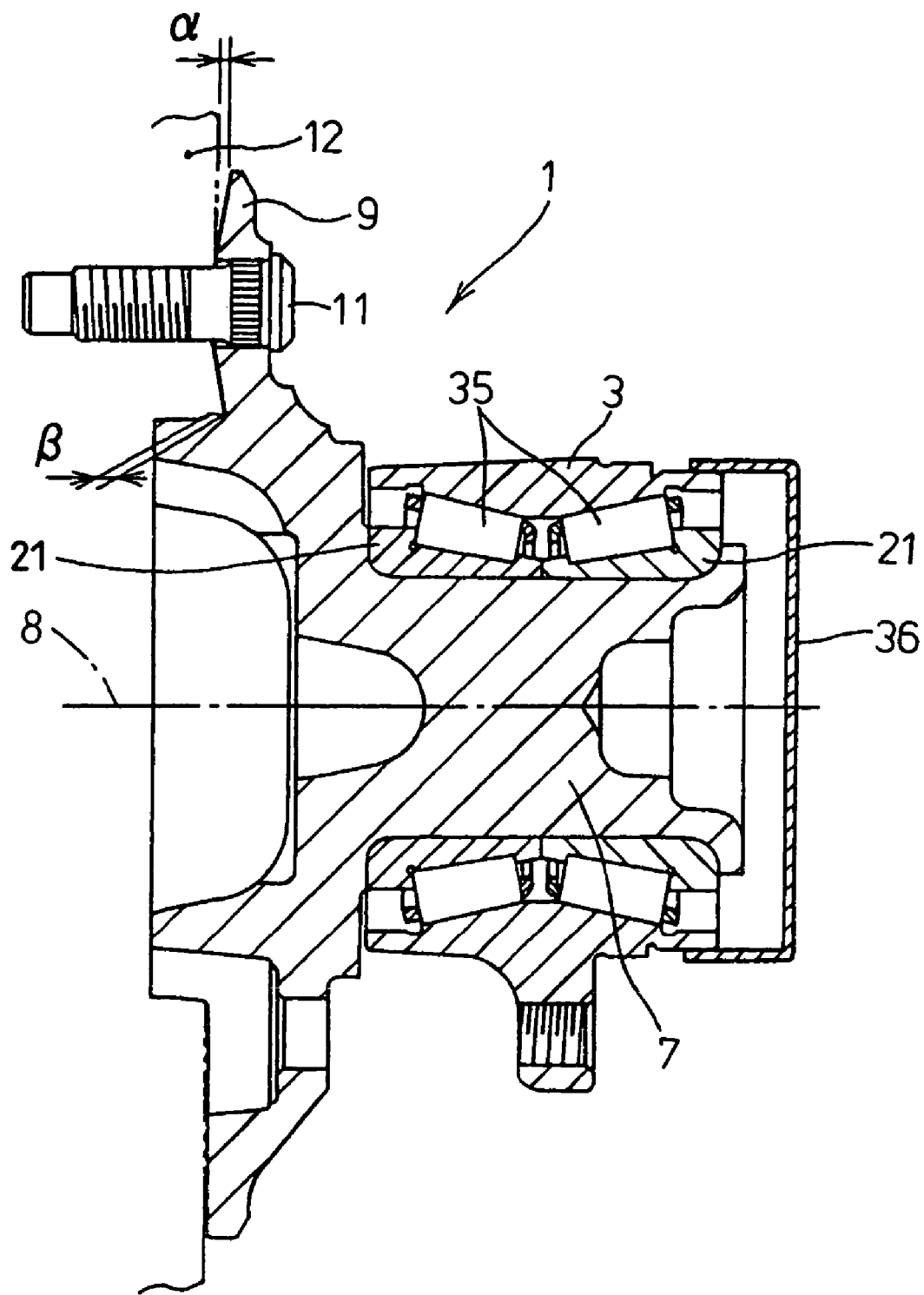

Among these wheel-use hearing apparatuses 1, ones shown in FIGS. 8A and 8B are used with a driven wheel and are configured as follows. Inner ring members 21, 21 with double raceways are supported in an outer ring member 3 mounted in the vehicle-body side to be rotatable on a rotational center axis 8 via rollers 35, 35 provided as rolling elements. A hub wheel 7 is inserted into the inner ring members 21, 21 and an axial end portion of the hub wheel 7 is caulked onto an end face of the end face of one of the inner ring members 21. A waterproof cover 36 is mounted onto an end portion of the outer ring member 3, a flange 9 is formed on the hub wheel 7, and bolts 11 are press-inserted into the flange 9.

Figure 9A:
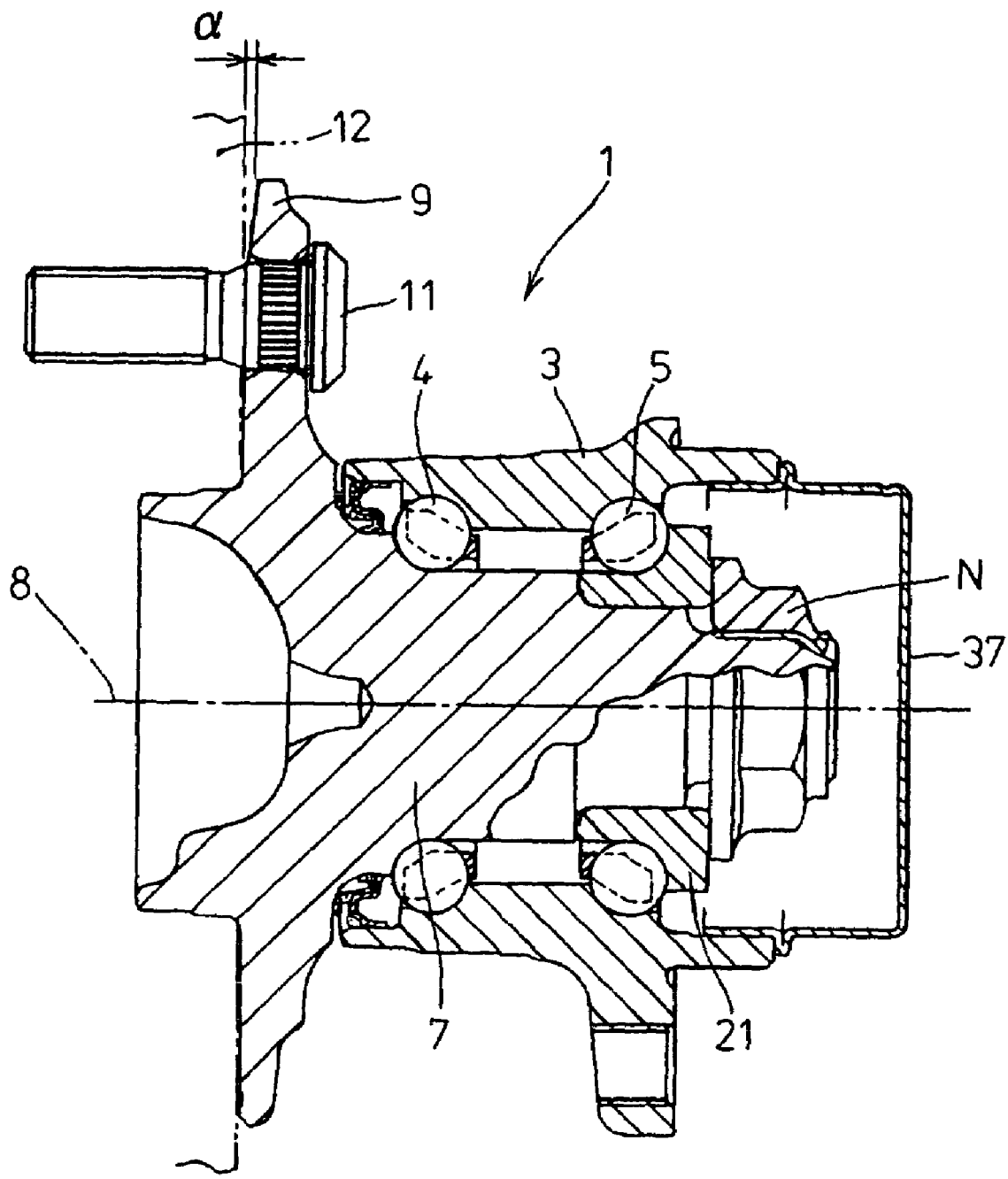
FIGS. 9A and 9B are cross-sectional views showing the overall configurations of wheel-use bearing apparatuses according to still further alternative embodiments of the present invention.
Figure 9B:
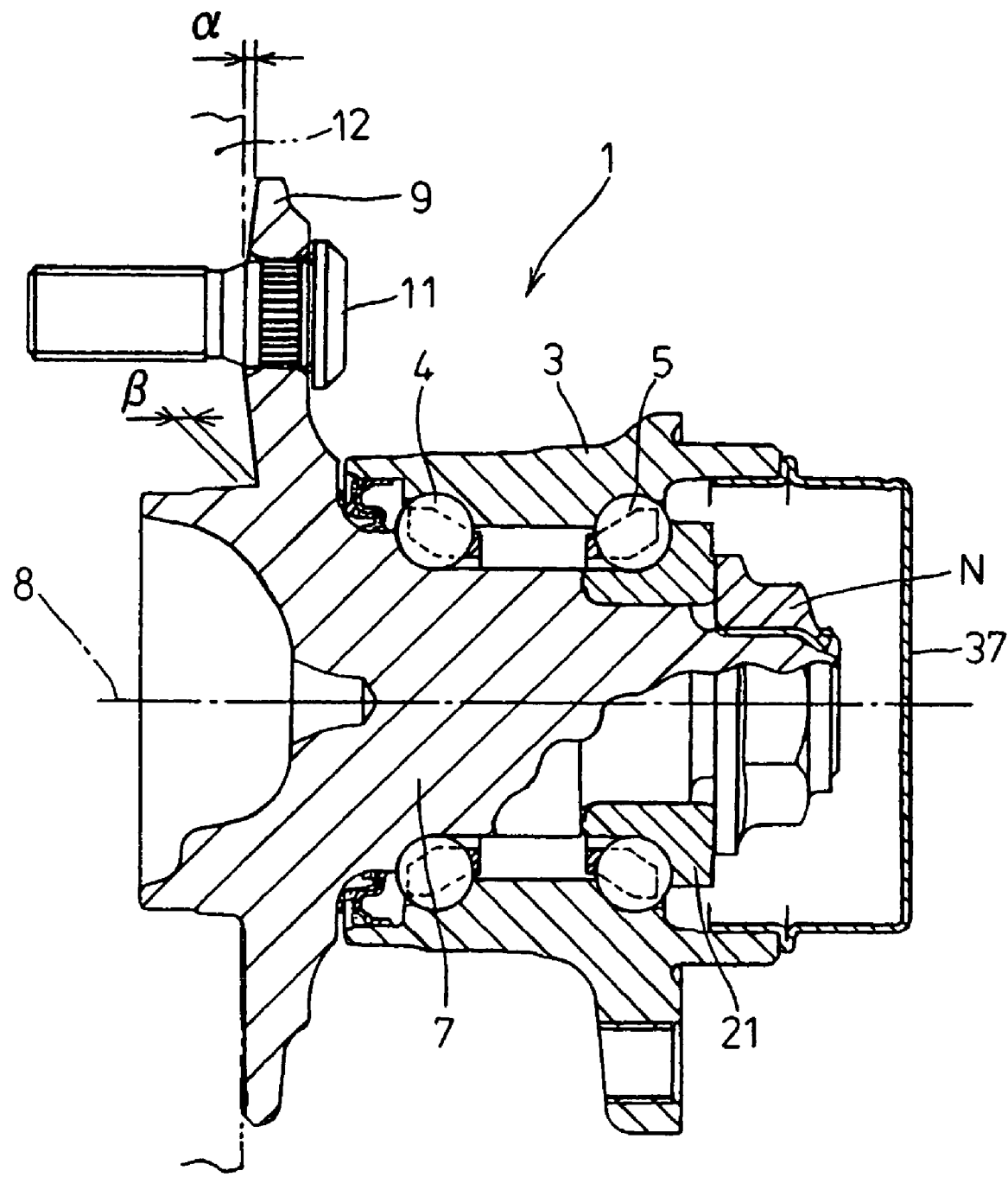

The wheel-use bearings 1 shown in FIGS. 9A and 9B are used with a driven wheel and are configured as follows. An inner ring member 21 is fitted into an outer ring member 3 mounted in the vehicle-body side. A hub wheel 7 and the inner ring member 21 are supported in the outer ring member 3 to be rotatable on a rotational center axis 8 via balls 4 and 5 with double raceways and a nut N is tightened on an end portion of the hub wheel 7. A cover 37 is mounted onto the outer ring member 3 to prevent muddy water or the like from flowing to a vehicle speed sensor (not shown). A flange 9 is formed to the hub wheel 7, and bolts 11 are press-inserted into the flange 9.

Figure 10A:
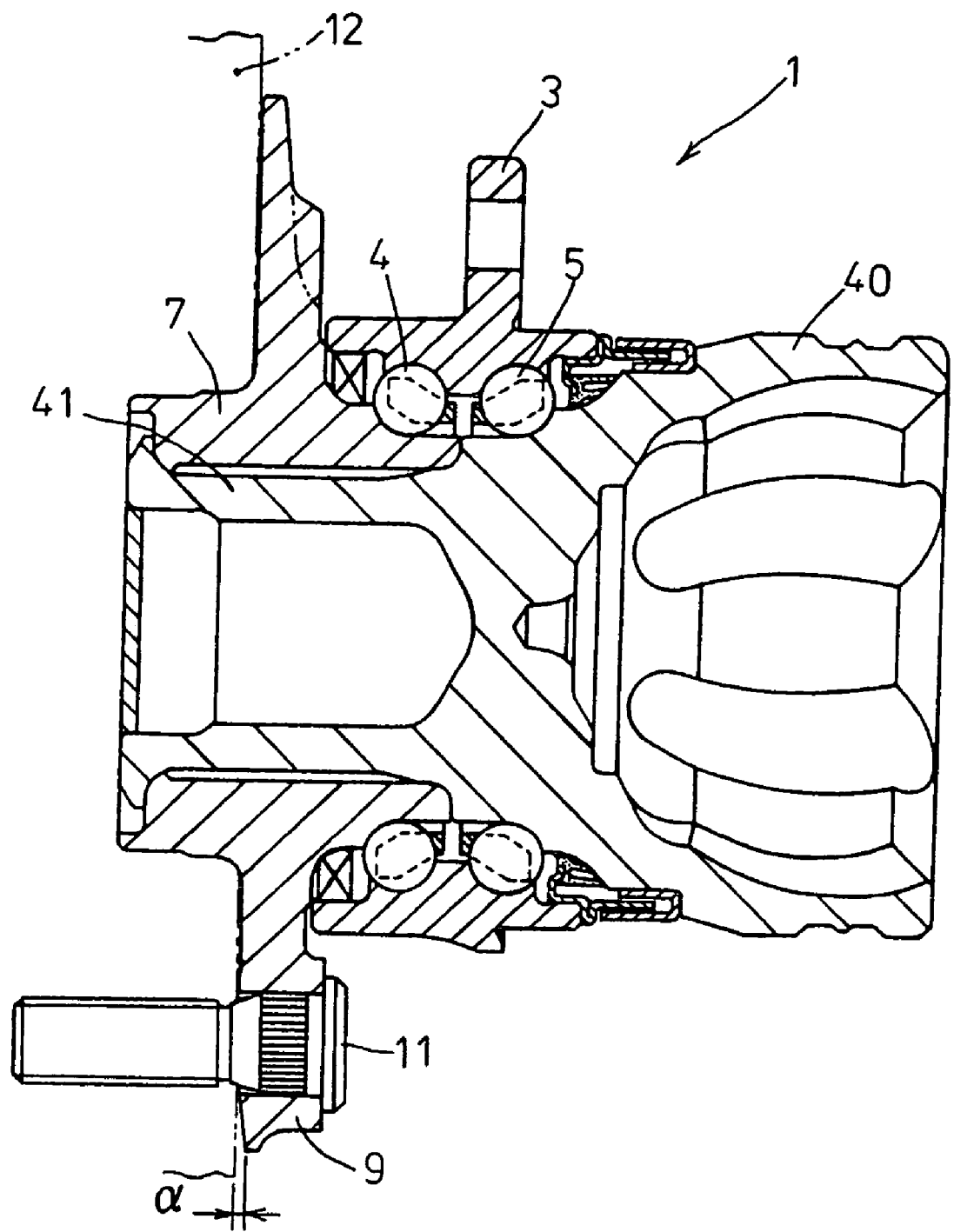
FIGS. 10A and 10B are cross-sectional views showing the overall configurations of wheel-use bearing apparatuses according to still further alternative embodiments of the present invention.
Figure 10B:
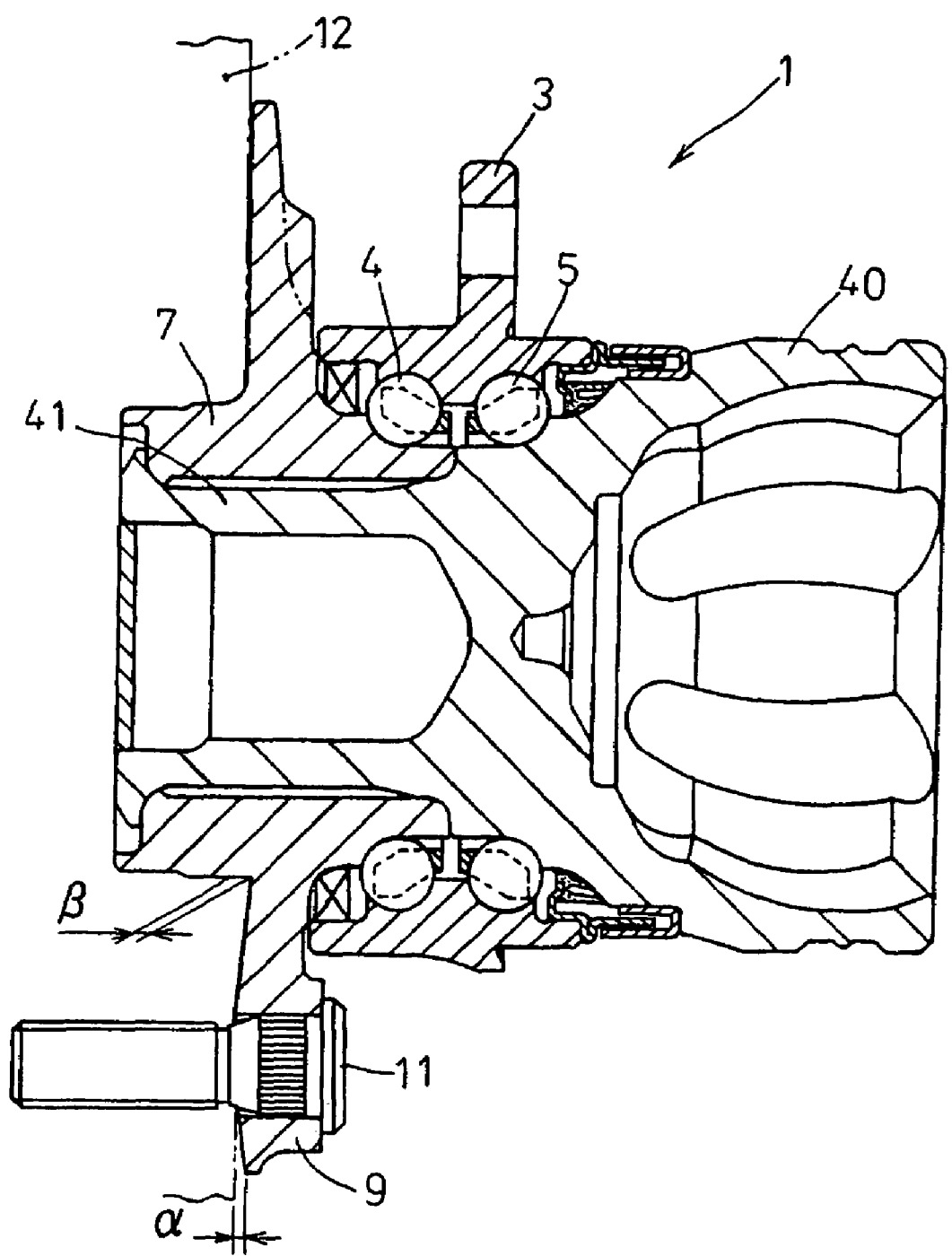
Figure 11:
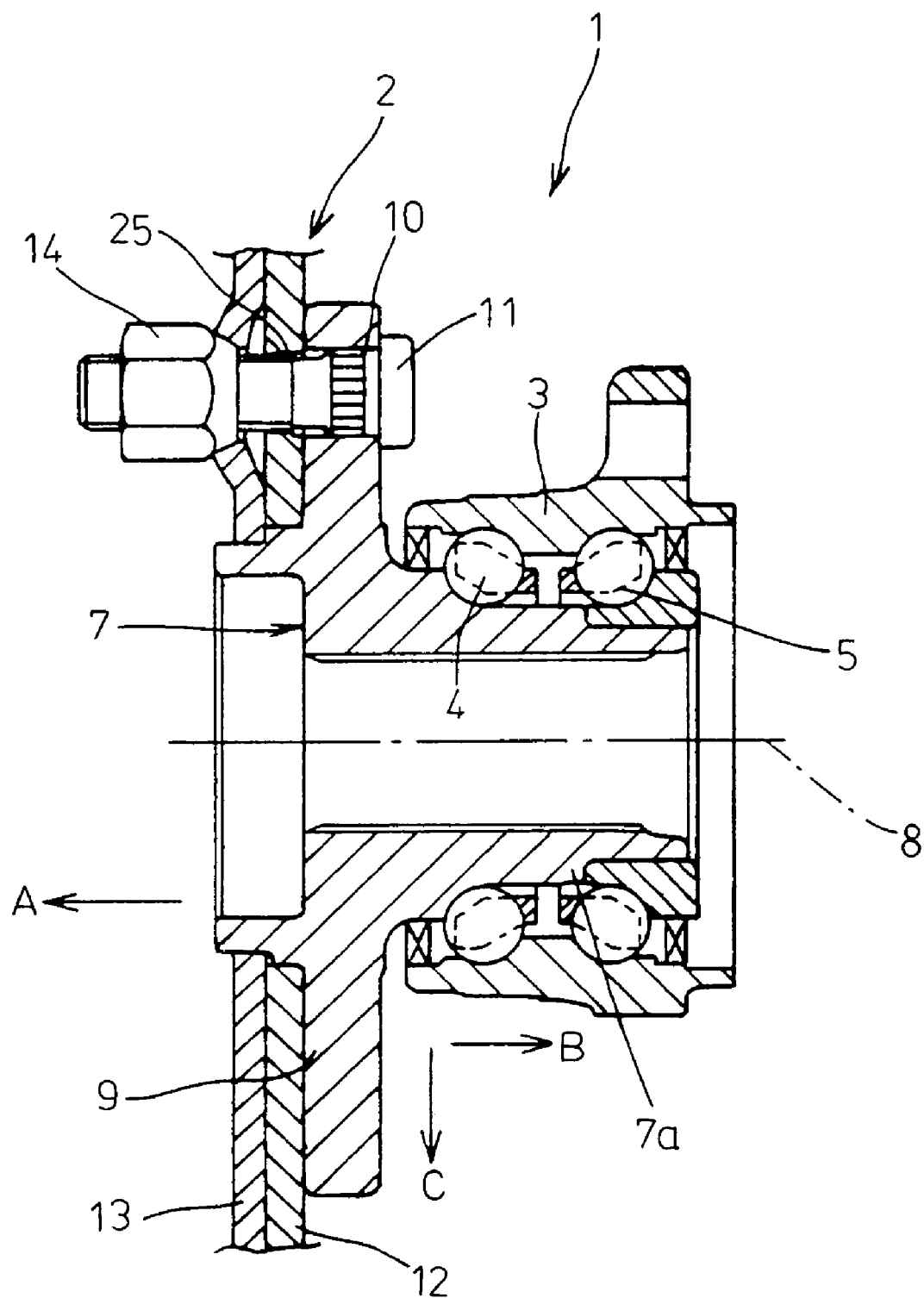
FIG. 11 is a cross-sectional view showing the overall configuration of a conventional wheel-use bearing apparatus.

The wheel-use bearings 1 shown in FIGS. 10A and 10B are used with a driven wheel and are configured as follows. An axial portion 41 is formed integrally with a cup-shaped outer ring member 40 provided as a constant-velocity universal joint, and is inserted into a hub wheel 7, and an end portion of the axial portion 41 is caulked. The hub wheel 7 and the cup-shaped outer ring member 40 are supported in an outer ring member 3 to be rotatable on a rotational center axis 8 via double rows of balls 4 and 5. A flange 9 is formed to the hub wheel 7, and bolts 11 are press-inserted into the flange 9.

Also in the wheel-use bearing apparatuses 1 shown in FIGS. 8A, 8B, 9A, 9B, 10A and 10B, the maximum oppositely-spaced distance α from a disc rotor 12 in the outer circumferential end face of the flange 9 or the maximum oppositely-spaced distance β in the base end portion of the flange 9 is set similar to that in the respective embodiment described above. Thereby, even when the bolts 11 are press-inserted into the flange 9, the accuracy of side run-out with the surface of the disc rotor 12 can be prevented from being deteriorated.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A bearing apparatus for mounting a wheel to a vehicle and to support a brake disc, said bearing apparatus having an inboard side facing said vehicle when said bearing apparatus is mounted to said vehicle and an outboard side opposite from said inboard side, comprising:

an outer ring member non-rotatably mountable to said vehicle by a mounting structure connected to the outer ring member;

an inner ring member that is disposed concentric with said outer ring member about a center axis;

a plurality of rolling elements provided between said outer ring member and said inner ring member;

a hub wheel having a radially-outwardly extending flange, the hub wheel being inserted in said inner ring member and having an axial end face caulked to said inner ring member;

said flange of said hub wheel having a flange face in which boltholes are through-formed and onto which the brake disc is mounted by bolts press inserted through the boltholes, said flange face being on said outboard side of said bearing apparatus; and said flange face having a receded flange face portion extending radially outward from radially outermost circumferential points of said boltholes with respect to said center axis, said receded flange face portion being increasingly receded from a plane perpendicular to said center axis with increasing radial distance from said center axis.

2. A bearing apparatus for mounting a wheel to a vehicle and to support a brake disc, said bearing apparatus having an inboard side facing said vehicle when said bearing apparatus is mounted to said vehicle and an outboard side opposite from said inboard side, comprising:

an outer ring member;

an inner ring member that is disposed concentric with said outer ring member about a center axis;

a plurality of rolling elements provided between said outer ring member and said inner ring member;

a flange fixedly connected to one of said outer ring member and said inner ring member to rotate with said one of said outer ring member and said inner ring member, and said flange having a flange face in which boltholes are through-formed and bolts press inserted through the boltholes, said flange face being on said outboard side of said bearing apparatus;

a mounting member for mounting the bearing apparatus to the vehicle, the mounting member being fixedly connected to another one of said outer ring member and said inner ring member; and said flange face having a receded flange face portion extending radially outward of said boltholes with respect to said center axis, said receded flange face portion being increasingly receded from a plane perpendicular to said center axis with increasing radial distance from said center axis, wherein said receded flange face portion extends radially outward from radially outermost circumferential points of said boltholes.

3. The bearing apparatus according to claim 2, wherein the brake disc is fixed to the flange face such that said brake disc lies on at least a portion of said flange face and is fixed by the bolts press inserted through the boltholes, and nuts are tightened onto the bolts to fix the brake disc.

4. The bearing apparatus according to claim 2, wherein said receded flange face portion is an annular face formed a circumferentially around said flange.

5. The bearing apparatus according to claim 4, wherein said annular face is frustoconical.

6. The bearing apparatus according to claim 2, wherein said receded flange face portion includes annular portions around said boltholes.

7. The bearing apparatus according to claim 6, wherein said annular portions are frustoconical and formed circularly concentric with said boltholes.

8. The bearing apparatus according to claim 2, further comprising an inner receded flange face portion extending radially inward from radially innermost circumferential points of said boltholes, said inner receded flange face portion being increasingly receded from a plane perpendicular to said center axis with decreasing radial distance to said center axis.

9. The bearing apparatus according to claim 8, wherein a maximum distance of recession of said inner receded flange face portion is set to 20 μm or less.

10. The bearing apparatus according to claim 1, wherein the brake disc is fixed to the flange face such that said brake disc lies on at least a portion of said flange face and is fixed by the bolts press inserted through the boltholes, and nuts are tightened onto the bolts to fix the brake disc.

11. The bearing apparatus according to claim 1, wherein a maximum distance of recession of the receded flange face portion is set to 20 μm or less.

12. The bearing apparatus according to claim 1, wherein said receded flange face portion is an annular face formed a circumferentially around said flange.

13. The bearing apparatus according to claim 12, wherein said annular face is frustoconical.

14. The bearing apparatus according to claim 1, wherein said receded flange face portion includes annular portions around said boltholes.

15. The bearing apparatus according to claim 14, wherein said annular portions are frustoconical and formed circularly concentric with said boltholes.

16. The bearing apparatus according to claim 1, wherein said receded flange face portion extends radially outward from radially outermost circumferential points of said boltholes.

17. The bearing apparatus according to claim 1, further comprising an inner receded flange face portion extending radially inward from radially innermost circumferential points of said boltholes, said inner receded flange face portion being increasingly receded from a plane perpendicular to said center axis with decreasing radial distance to said center axis.

18. The bearing apparatus according to claim 17, wherein a maximum distance of recession of said inner receded flange face portion is set to 20 μm or less.

19. The bearing apparatus according to claim 2, wherein a maximum distance of recession of said inner receded flange face portion is set to 20 μm or less.

* * * * *